United States Patent
Sueyoshi et al.

(10) Patent No.: US 6,295,319 B1
(45) Date of Patent: Sep. 25, 2001

(54) DECODING DEVICE

(75) Inventors: Masahiro Sueyoshi, Hirakata; Masaharu Matsumoto, Katano; Shuji Miyasaka, Neyagawa; Takeshi Fujita, Takatsuki; Takashi Katayama, Katano; Kazutaka Abe, Kadoma; Kosuke Nishio, Neyagawa; Akihisa Kawamura, Hirakata; Tsukuru Ishito, Kyoto; Tsuyoshi Nakamura, Fukuoka-ken; Eiji Otomura, Ibaraki, all of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/280,612

(22) Filed: Mar. 29, 1999

(30) Foreign Application Priority Data

Mar. 30, 1998 (JP) ................................. 10-083363

(51) Int. Cl.[7] .............................. H04B 1/66; G11B 3/90; G11B 7/24
(52) U.S. Cl. ..................... 375/240.01; 348/462; 369/60
(58) Field of Search ................... 348/423, 462, 348/466; 375/240, 240.01, 240.1, 240.16; 386/33, 39, 96, 98, 99, 101, 104–106, 111, 112; 369/32, 48, 47, 54, 58, 275.3, 60; H04B 1/66; G11B 3/90, 7/24

(56) References Cited

U.S. PATENT DOCUMENTS

| | | | |
|---|---|---|---|
| 5,936,925 | * 8/1999 | Yoshio et al. | 369/60 |
| 6,005,599 | * 12/1999 | Asai et al. | 348/7 |
| 6,034,942 | * 3/2000 | Yoshio et al. | 369/275.3 |
| 6,047,101 | * 4/2000 | Kawamura et al. | 386/68 |

FOREIGN PATENT DOCUMENTS 0883125  9/1998  (EP) .
0847155  10/1998  (EP) .

OTHER PUBLICATIONS

ISO/IEC CD, 13818–3.2, pp. 54–55.
Takayanagi, T et al., 350 MHz time–multiplexed 8–port SRAM and Wor size variable multimedia DSP, Solid–State Ciercuit Conference, 1996. Digest of Technical Pappers. 42nd ISSC IEEE International, 1996, pp. 150–151.*
Proidevaux, M. et al., MPEG1 and MPEG2 system layer implementation trade–off between coded and FSM architecture, Comsumer Electronics, 1995., Proeeding of International Conference on , 1995, pp. 250–151.*

* cited by examiner

Primary Examiner—Chris Kelley
Assistant Examiner—Tung Vo
(74) Attorney, Agent, or Firm—Renner, Otto, Boisselle & Sklar LLP

(57) ABSTRACT

A decoding device for decoding a bit stream defined by MPEG2 Audio Multichannel is provided. The bit stream including an MPEG1 compatible area and an MPEG2 multichannel extended area, the MPEG1 compatible area including MPEG1 side information. The decoding device includes: MPEG1 decoding means for decoding the MPEG1 compatible area; MC decoding means for decoding the MPEG2 multichannel extended area; and MC header detection means for executing a first processing including locating a position of a header of the MPEG2 multichannel extended area based on the MPEG1 side information and shifting a read position of the bit stream to the position of the header.

13 Claims, 3 Drawing Sheets

DECODING DEVICE

BACKGROUND OF THE INVENTION

1. Field of the Invention

The present invention relates to a decoding device for decoding a bit stream defined by MPEG2 Multichannel, Layer II, for example, or decoding both a bit stream defined by MPEG2 Multichannel and a bit stream defined by MPEG1.

2. Description of the Related Art

Conventionally, in a decoding device for decoding a bit stream defined by MPEG2 Multichannel stipulated in ISO-IEC 13818-3.2, decoding of an MPEG2 multichannel extended area of a bit stream defined by MPEG2 Multichannel is begun only after decoding of an MPEG1 compatible area thereof is completed. Such a conventional MPEG2 multichannel decoding device is therefore required to secure a memory of at least [2×1152×(number of bytes given to one sample after reverse quantization)] bytes.

On the other hand, in a conventional decoding device for decoding both a bit stream defined by MPEG2 Multichannel and a bit stream defined by MPEG1, whether or not a bit stream is a bit stream defined by MPEG2 Multichannel is determined in the following manner. An MPEG2 multichannel determination method stipulated in ISO-IEC 13818-3, for example, uses cyclic redundancy check (CRC). According to this method, even if the bit stream is a bit stream defined by MPEG1 which does not include an MPEG2 multichannel extended area, decoding for multichannel streams is performed if the bit stream passes the CRC (error check). This causes erroneous operation.

Another problem is that, in a decoding method stipulated in ISO-IEC 13818-3, for example, decoding is continued even when a length of bit stream exceeding one frame length has been decoded. This also causes erroneous operation.

As described above, the conventional MPEG2 multichannel decoding device has a problem of requiring a buffer memory with large capacity, thereby increasing the size of the device.

The conventional decoding device which decodes both bit streams defined by MPEG2 Multichannel and MPEG1 also has a problem that decoding for MPEG2 multichannel streams is performed for an MPEG1 bit stream if the bit stream passes the CRC for MPEG2 multichannel streams, causing erroneous operation.

The object of the present invention is to provide a decoding device capable of decoding an MPEG2 multichannel bit stream using a buffer memory with a small capacity and determining correctly whether or not an MPEG2 multichannel extended area exists in a bit stream in the case where the decoding device decodes both bit streams defined by MPEG1 and MPEG2 Multichannel.

SUMMARY OF THE INVENTION

According to one aspect of the present invention, a decoding device is provided for decoding a bit stream defined by MPEG2 Audio Multichannel, the bit stream including an MPEG1 compatible area and an MPEG2 multichannel extended area, the MPEG1 compatible area including MPEG1 side information. The decoding device includes: MPEG1 decoding means for decoding the MPEG1 compatible area; MC decoding means for decoding the MPEG2 multichannel extended area; and MC header detection means for executing a first processing including locating a position of a header of the MPEG2 multichannel extended area based on the MPEG1 side information and shifting a read position of the bit stream to the position of the header.

In one embodiment of the invention, the MC header detection means executes the first processing on the way to the decoding of the MPEG1 compatible area by the MPEG1 decoding means. The MC decoding means executes a predetermined second processing after the MC header detection means executes the first processing.

In one embodiment of the invention, after the execution of the predetermined second processing by the MC decoding means, the decoding device alternately executes the decoding of the MPEG1 compatible area by the MPEG1 decoding means and the decoding of the MPEG2 multichannel extended area by the MC decoding means.

In one embodiment of the invention, the bit stream includes a bit stream defined by MPEG2 Audio Multichannel, Layer I. The MPEG1 side information includes allocation information. The MC header detection means locates the position of the header of the MPEG2 multichannel extended area based on the allocation information.

In one embodiment of the invention, the bit stream includes a bit stream defined by MPEG2 Audio Multichannel, Layer II. The MPEG1 side information includes allocation information and scale factor selection information. The MC header detection means locates the position of the header of the MPEG2 multichannel extended area based on the allocation information and the scale factor selection information.

In one embodiment of the invention, the predetermined second processing includes a processing of reading MC side information from the position and executing error check for the MC side information.

In one embodiment of the invention, the error check includes at least CRC.

According to another aspect of the present invention, a decoding device is provided for decoding a first bit stream defined by MPEG1 and a second bit stream defined by MPEG2 Audio Multichannel, the first bit stream including an MPEG1 compatible area, the second bit stream including the MPEG1 compatible area and an MPEG2 multichannel extended area, the MPEG1 compatible area including MPEG1 side information. The decoding device includes: MPEG1 decoding means for decoding the MPEG1 compatible area; MC decoding means for decoding the MPEG2 multichannel extended area; and MC header detection means for executing a first processing including locating a position of a header of the MPEG2 multichannel extended area based on the MPEG1 side information and shifting a read position of the bit stream to the position of the header. The MC header detection means executes the first processing on the way to a processing of the MPEG1 decoding means. The MC decoding means reads information from the position after the MC header detection means executes the first processing, and executes CRC for the information, when results of the CRC are normal. The decoding device alternately executes the decoding of the MPEG1 compatible area by the MPEG1 decoding means and the decoding of the MPEG2 multichannel extended area by the MC decoding means. When the results of the CRC are abnormal, the decoding device executes only the decoding of the MPEG1 compatible area by the MPEG1 decoding means.

According to still another aspect of the present invention, a decoding device is provided for decoding a first bit stream defined by MPEG1 and a second bit stream defined by MPEG2 Audio Multichannel, the first bit stream including an MPEG1 compatible area, the second bit stream including the MPEG1 compatible area and an MPEG2 multichannel extended area, the MPEG1 compatible area including MPEG1 side information. The decoding device includes: MPEG1 decoding means for decoding the MPEG1 compatible area; MC decoding means for decoding the MPEG2 multichannel extended area; and MC header detection means for executing a first processing including locating a position of a header of the MPEG2 multichannel extended area based on the MPEG1 side information and shifting a read position of the bit stream to the position of the header. The MC header detection means executes the first processing on the way to a processing of the MPEG1 decoding means. The MC decoding means determines whether or not the number of channels in the MPEG2 multichannel extended area is zero based on information read from a position where MC side information for the MPEG2 multichannel extended area is stored. If the number of channels in the MPEG2 multichannel extended area is zero, the decoding of the MPEG2 multichannel extended area is not performed, but only the MPEG1 compatible area is decoded.

In one embodiment of the invention, the MC decoding means reads information from the position after the MC header detection means executes the first processing, and executes CRC for the information. If the number of channels in the MPEG2 multichannel extended area is zero, the decoding device does not decode the MPEG2 multichannel extended area but decodes only the MPEG1 compatible area, even when results of the CRC are normal.

According to still another aspect of the present invention, a decoding device for decoding a first bit stream defined by MPEG1 and a second bit stream defined by MPEG2 Audio Multichannel, the first bit stream including an MPEG1 compatible area, the second bit stream including the MPEG1 compatible area and an MPEG2 multichannel extended area, the MPEG1 compatible area including MPEG1 side information. The decoding device includes: MPEG1 decoding means for decoding the MPEG1 compatible area; and MC decoding means for decoding the MPEG2 multichannel extended area. The decoding device terminates the decoding if a length of the bit stream consumed in the decoding of the MPEG2 multichannel extended area by the MC decoding means exceeds a stream length of one frame, and decodes only the MPEG1 compatible area.

In one embodiment of the invention, the stream length of one frame comprises a sum of an MPEG1 base frame length and an extension stream length when an extension stream defined by MPEG2 Audio Multichannel is included in the bit stream, and comprises the MPEG1 base frame length when no extension stream is included.

In one embodiment of the invention, the stream length of one frame comprises a value obtained by subtracting n_ad_ bytes defined by MPEG2 Multichannel from a sum of an MPEG1 base frame length and an extension stream length when an extension stream defined by MPEG2 Audio Multichannel is included in the bit stream, and comprises the MPEG1 base frame length when no extension stream is included.

Thus, according to the decoding device of the present invention, the position of the header of the MPEG2 multichannel extended area is calculated on the way to the decoding of the MPEG1 compatible area, so that the decoding of the MPEG2 multichannel extended area is begun before the decoding of the MPEG1 compatible area is completed. Thereafter, the MPEG1 compatible area and the MPEG2 multichannel extended area are alternately decoded, to achieve multichannel stream decoding.

Alternatively, according to the present invention, in the decoding device which decodes both bit streams defined by MPEG1 and MPEG2 Multichannel, decoding for an MPEG2 multichannel extended area is not performed for a bit stream if the number of channels in the MPEG2 multichannel extended area is zero even when the bit stream passes CRC for the MPEG2 multichannel extended area, but only the MPEG1 compatible area is decoded. Moreover, decoding of the MPEG2 multichannel extended area is terminated if a length of bit stream exceeding one frame length has been decoded, and only the MPEG1 compatible area is decoded. This suppresses an occurrence of erroneous operation.

Thus, the invention described herein makes possible the advantage of providing a decoding device capable of decoding an MPEG2 multichannel bit stream using a buffer memory with a small capacity and determining correctly whether or not an MPEG2 multichannel extended area exists in a bit stream in the case where the decoding device decodes both bit streams defined by MPEG1 and MPEG2 Multichannel.

This and other advantages of the present invention will become apparent to those skilled in the art upon reading and understanding the following detailed description with reference to the accompanying figures.

DESCRIPTION OF THE PREFERRED EMBODIMENTS

An embodiment of the present invention will be described with reference to FIGS. 1 to 3, taking as an example the case of decoding a bit stream of a format having no extension stream defined by MPEG2 Multichannel, Layer II.

Figure 1:
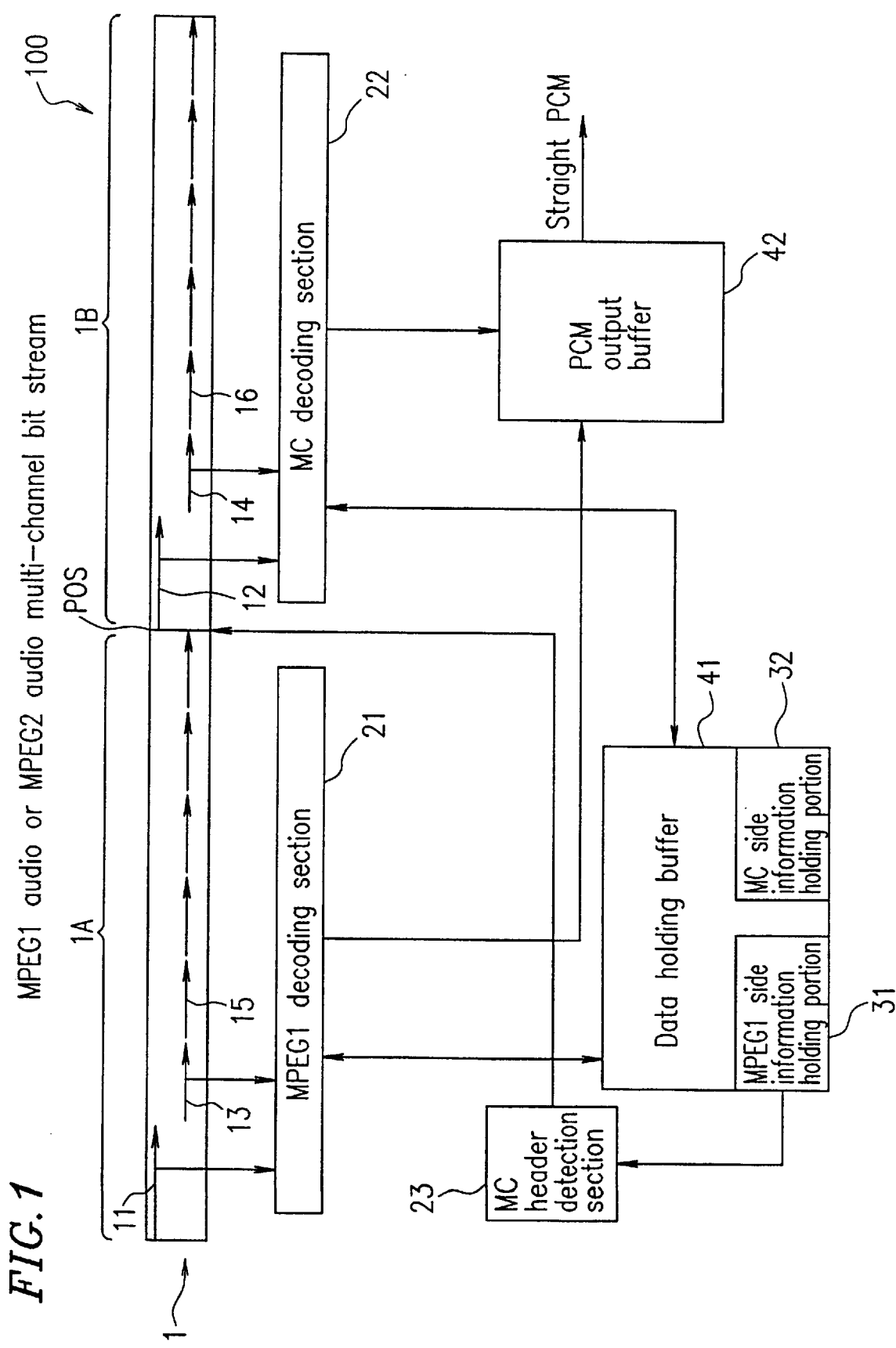
FIG. 1 is a block diagram of a decoding device of an embodiment according to the present invention.

FIG. 1 is a block diagram of a decoding device 100 of an embodiment according to the present invention, schematically illustrating decoding of a bit stream 1 of a format having no extension stream defined by MPEG2 multichannel, Layer II. Referring to FIG. 1, the decoding device 100 of this embodiment includes: an MPEG1 decoding section 21 for decoding an MPEG1 compatible area 1A of the bit stream 1; a multichannel (MC) decoding section 22 for decoding an MC area 1B of the bit stream 1; an MC header detection section 23 for locating a head position (POS) of the MC area 1B and shifting a stream read pointer for reading the bit stream 1 to the head position (POS) of the MC area 1B; a data holding buffer 41 for holding calculation data; and a pulse code modulation (PCM) output buffer 42 for holding decoded PCM data and outputting the data outside.

In FIG. 1, the bit stream 1, defined by MPEG2 Multichannel, Layer II, includes MPEG1 side information 11, MC side information 12, an MPEG1 sample, and an MC sample. The MPEG1 sample is divided into six blocks, including a first MPEG1 sample information block 13 and a second MPEG1 sample information block 15. The MC sample is divided into six blocks, including a first MC sample information block 14 and a second MC sample information block 16.

Although the respective samples are divided into six blocks for decoding in this embodiment, the number of blocks is not essential for the present invention. The sample may be divided into any number of blocks, or may even not be divided.

It is assumed in this embodiment that RAMs are used as media for storing the bit stream 1, as well as for the data holding buffer 41 and the PCM output buffer 42. The media used for the buffers is not essential for the present invention, but any medium may be used as long as it can realize input/output of information.

In this embodiment, the data holding buffer 41 and the PCM output buffer 42 are shown as separate buffers. The construction of the buffers is not essential for the present invention. For example, these buffers may share one memory.

The operation of the decoding device 100 of this embodiment will be described.

First, the MPEG1 decoding section 21 receives the MPEG1 side information 11 including header information, allocation information, and scale factor selection information, decodes such information, and outputs the decoded information to the data holding buffer 41. The MC header detection section 23 calculates a head address of the MC side information 12 based on the header information, the allocation information, and the scale factor selection information of the MPEG1 side information 11 held in the data holding buffer 41, and shifts the stream read pointer to the head address.

The MC header detection section 23 will be described in more detail with reference to FIG. 2.

Figure 2:
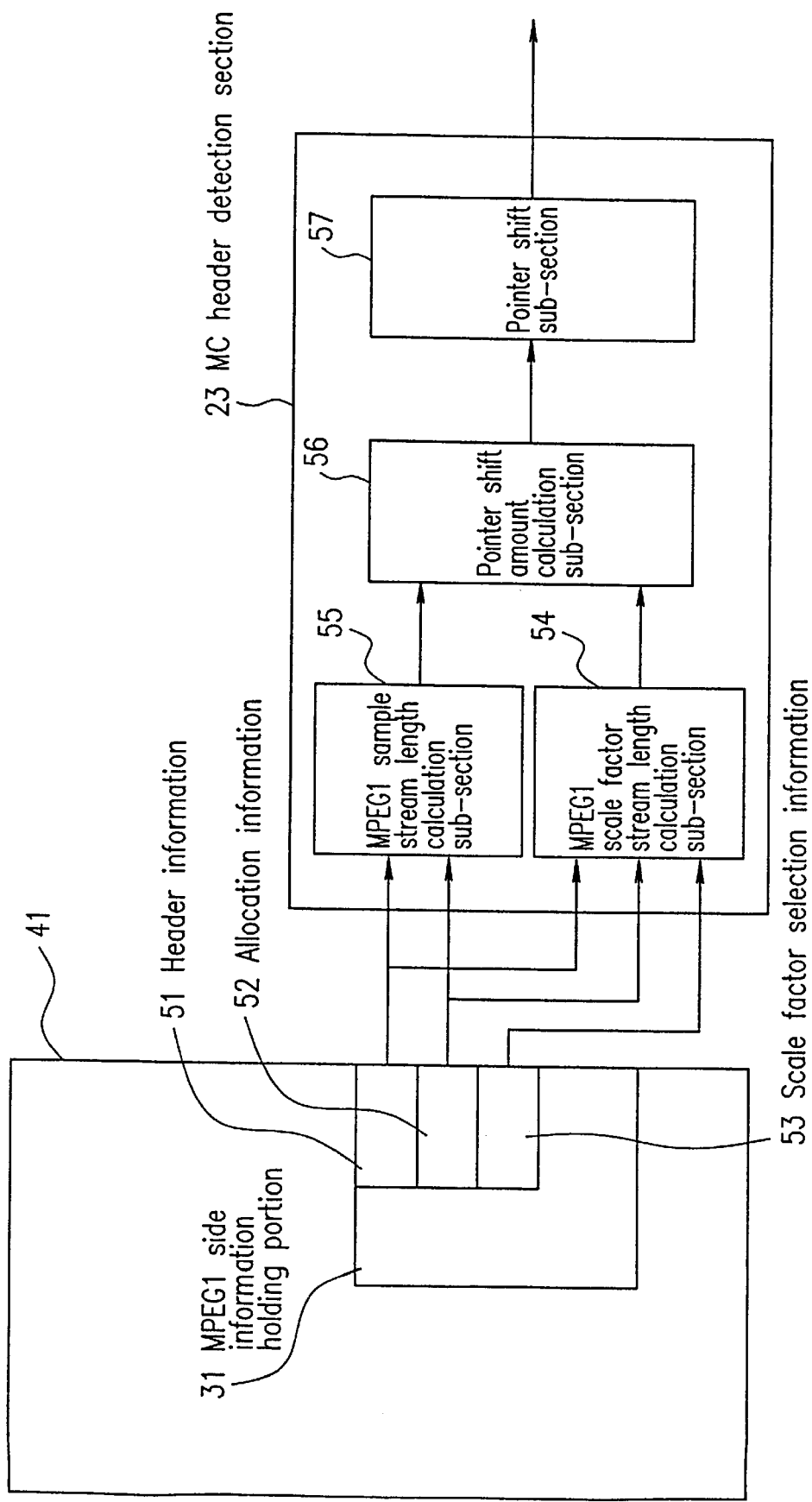
FIG. 2 is a schematic view illustrating the detection of a multichannel header.
Figure 3:
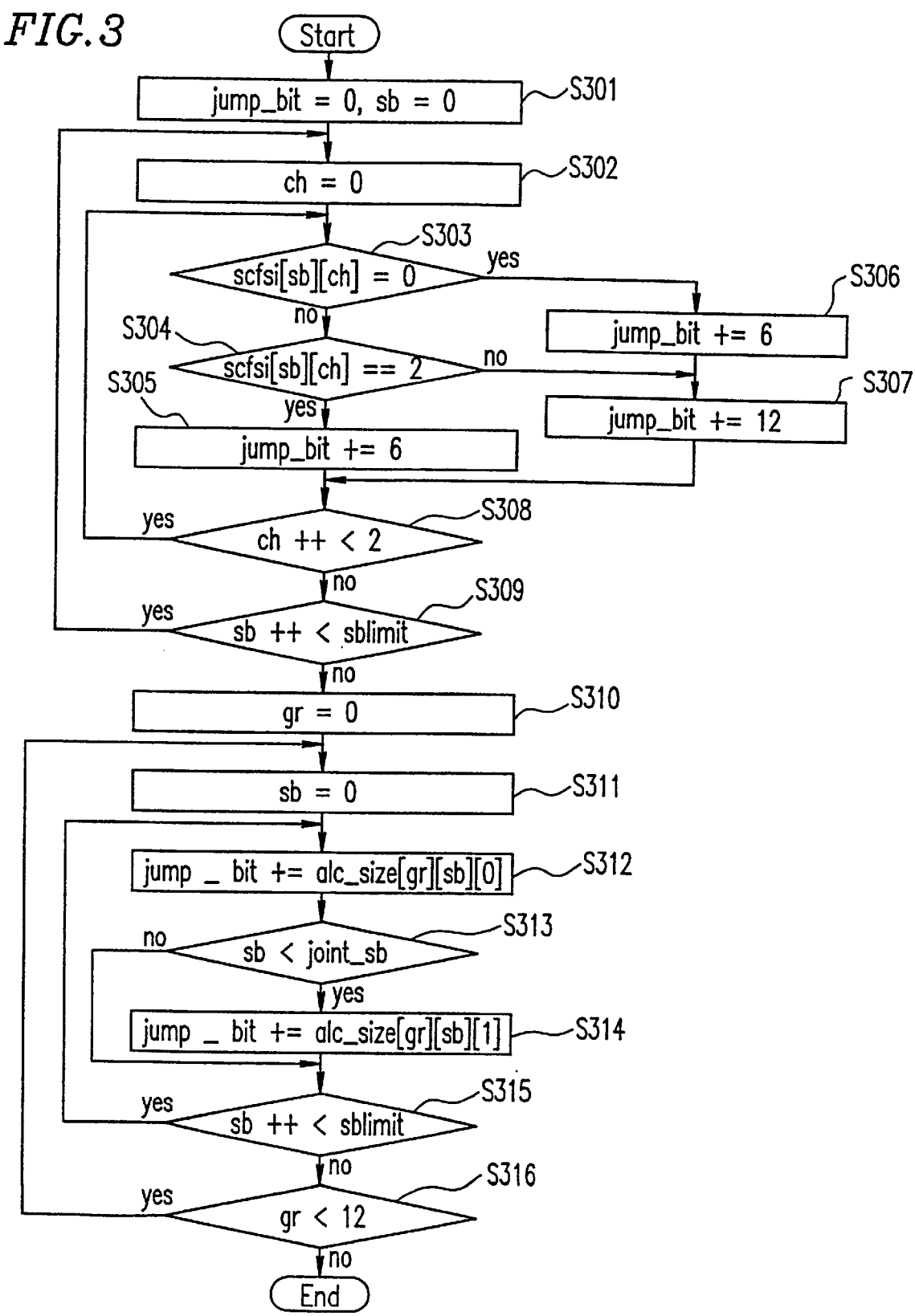
FIG. 3 is a flowchart showing a procedure for locating the multichannel header.

Referring to FIG. 2, the MC header detection section 23 receives header information 51, allocation information 52, and scale factor selection information 53 held in an MPEG1 side information holding portion 31 of the data holding buffer 41, and holds such information in an MPEG1 scale factor stream length calculation sub-section 54 to calculate a stream length of an MPEG1 scale factor. The header information 51 and the allocation information 52 are also input into an MPEG1 sample stream length calculation sub-section 55 to calculate a stream length of the MPEG1 sample. The stream length of the MPEG1 scale factor and the stream length of the MPEG1 sample are then input into a pointer shift amount calculation sub-section 56 to calculate the shift amount of the stream read pointer. The shift amount of the stream read pointer calculated by the pointer shift amount calculation sub-section 56 is input into a pointer shift sub-section 57, so that the stream read pointer can be shifted.

The procedure of the calculation of the shift amount of the stream read pointer by the pointer shift amount calculation sub-section 56 will be described with reference to FIG. 3.

Steps S301 to S309 represent the calculation based on the output from the MPEG1 scale factor stream length calculation sub-section 54. Steps S310 to S316 represent the calculation based on the output from the MPEG1 sample stream length calculation sub-section 55.

The pointer shift amount calculation sub-section 56 initializes a shift amount (jump_bit) of the stream read pointer and a subband (sb) (step S301) and initializes a channel (ch) (step S302). The pointer shift amount calculation sub-section 56 then determines whether or not scale factor selection information (scfsi[sb] [ch]) is 0 (step S303).

If it is determined that the scale factor selection information (scfsi[sb] [ch]) is 0, the pointer shift amount calculation sub-section 56 increases the shift amount (jump_bit) of the stream read pointer by 6 (step S306). If it is determined that the scale factor selection information (scfsi[sb] [ch]) is not 0, the pointer shift amount calculation sub-section 56 then determines whether or not the scale factor selection information (scfsi[sb] [ch]) is 2 (step S304).

If it is determined that the scale factor selection information (scfsi[sb] [ch]) is not 2, or after the shift amount (jump_bit) of the stream read pointer is increased by 6 at step S306, the pointer shift amount calculation sub-section 56 increases the shift amount (jump_bit) of the stream read pointer by 12 (step S307).

If it is determined that the scale factor selection information (scfsi[sb] [ch]) is 2, the pointer shift amount calculation sub-section 56 increases the shift amount (jump_bit) of the stream read pointer by 6 (step S305). After the shift amount (jump_bit) of the stream read pointer is increased by 6 at step S305, or after the shift amount (jump_bit) of the stream read pointer is increased by 12 at step S307, the pointer shift amount calculation sub-section 56 determines whether or not the channel (ch) increased by 1 is less than 2 (step S308).

If it is determined that the channel (ch) increased by 1 is less than 2, the pointer shift amount calculation sub-section 56 determines whether or not the scale factor selection information (scfsi[sb] [ch]) is 0 (step S303). If it is determined that the channel (ch) increased by 1 is not less than 2, the pointer shift amount calculation sub-section 56 determines whether or not the subband (sb) increased by 1 is less than a sublimit (sblimit) (step S309).

If it is determined that the subband (sb) increased by 1 is less than the sublimit (sblimit), the pointer shift amount calculation sub-section 56 initializes the channel (ch) (step S302).

The scale factor selection information (scfsi[sb] [ch]) can be a value of 0, 1, 2, or 3. As is understood from the above description, when the value of scale factor selection information (scfsi[sb] [ch]) is 0, the shift amount (jump_bit) of the stream read pointer increases by 18 for each loop. When the value of scale factor selection information (scfsi[sb] [ch]) is 1, the shift amount (jump_bit) of the stream read pointer increases by 12 for each loop. When the value of scale factor selection information (scfsi[sb] [ch]) is 2, the shift amount (jump_bit) of the stream read pointer increases by 6 for each loop. When the value of scale factor selection information (scfsi[sb] [ch]) is 3, the shift amount (jump_bit) of the stream read pointer increases by 12 for each loop.

If it is determined that the subband (sb) increased by 1 is not less than the sublimit (sblimit), the pointer shift amount calculation sub-section 56 initializes a group (gr) (step S310) and initializes the subband (sb) (step S311).

The pointer shift amount calculation sub-section 56 then adds the value of an allocation size of an L channel (alc_size[gr] [sb] [0]) to the shift amount (jump_bit) of the stream read pointer (step S312).

The pointer shift amount calculation sub-section 56 determines whether or not the subband (sb) is smaller than a joint subband (joint_sb) (step S313). If it is determined that the subband (sb) is smaller than the joint subband (joint_sb), the pointer shift amount calculation subsection 56 adds the value of an allocation size of a R channel (alc_size[gr] [sb] [1]) to the shift amount (jump_bit) of the stream read pointer (step S314).

After the value of the allocation size of a R channel (alc_size[gr] [sb] [1]) is added to the shift amount (jump_ bit) of the stream read pointer at step S314, or if it is determined that the subband (sb) is not less than the joint subband (joint_sb) at step S313, the pointer shift amount calculation sub-section 56 determines whether or not the subband (sb) increased by 1 is less than the subband limit (sblimit) (step S315). If it is determined that the subband (sb) increased by 1 is less than the subband limit (sblimit), the pointer shift amount calculation subsection 56 adds the value of the allocation size of the L channel (alc_size[gr][sb][0]) to the shift amount (jump_bit) of the stream read pointer (step S312).

When it is determined that the subband (sb) increased by 1 is not less than the subband limit (sblimit), the pointer shift amount calculation sub-section 56 determines whether or not the group (gr) is less than 12 (step S316). If it is determined that the group (gr) is less than 12, the pointer shift amount calculation sub-section 56 initializes the subband (sb) (step S311). If it is determined that the group (gr) is not less than 12, the pointer shift amount calculation sub-section 56 completes the calculation of the pointer shift amount.

By following the procedure described above, the position of the header of the MPEG2 multichannel extended area is located based on the MPEG1 side information.

Referring back to FIG. 1, the MC side information 12 is read from the position (POS) of the stream read pointer shifted by the MC header detection section 23, and input into the MC decoding section 22. The MC decoding section 22 first performs CRC (error check) for the input MC side information 12.

If the results of the CRC are acceptable, the MC decoding section 22 outputs the MC side information 12 read from the position of the stream read pointer of the bit stream 1 to be held in the data holding buffer 41, and then shifts the stream read pointer to the head position of the scale factor of the MPEG1 side information 11.

If the number of channels in the MC area 1B calculated based on the MC side information 12 is not zero, the MPEG1 decoding section 21 reads the bit stream from the position of the stream read pointer, decodes the scale factor of the MPEG1 side information 11 and the first MPEG1 sample information block 13, and outputs the decoded information to the PCM output buffer 42. The MPEG1 decoding section 21 then shifts the stream read pointer to the head of the first MC sample information block 14.

Subsequently, the MC decoding section 22 reads the first MC sample information block 14 from the position of the stream read pointer, decodes the first MC sample information block 14, and outputs the decoded information to the PCM output buffer 42. The MC decoding section 22 then shifts the stream read pointer to the head of the second MPEG1 sample information block 15.

A series of operations as described above, i.e., decoding the n-th MPEG1 sample information block, outputting the decoded information to the PCM output buffer 42, and shifting the stream read pointer by the MPEG1 decoding section 21, and decoding the n-th MC sample information block, outputting the decoded information to the PCM output buffer 42, and shifting the stream read pointer by the MC decoding section 22 are repeated in the range of $2 \leq n \leq 6$ (n is an integer). The MC decoding section 22 then shifts the stream read pointer to the head of the MPEG1 side information 11 of the next frame.

On the contrary, after the stream read pointer is shifted to the head position of the scale factor of the MPEG1 side information 11 by the MC decoding section 22, if the number of channels in the MC area 1B calculated based on the MC side information 12 is zero, the MPEG1 decoding section 21 reads the bit stream from the position of the stream read pointer, decodes the scale factor of the MPEG1 side information 11 and the first MPEG1 sample information block 13, and outputs the decoded information to the PCM output buffer 42. This series of operations, i.e., decoding the n-th MPEG1 sample information block and outputting the decoded information to the PCM output buffer 42 are repeated in the range of $2 \leq n \leq 6$ (n is an integer). The MPEG1 decoding section 21 then shifts the stream read pointer to the head of the MPEG1 side information 11 of the next frame.

In addition, the following processing is performed during the operations by the MC decoding section 22 described above. If the length of a stream from the head of a frame to the position of the stream read pointer at which the reading is under way becomes larger than a value obtained by subtracting a length of n_ad_bytes of the MC side information 12 from the length of the frame for which the operation is under way, the MC decoding section 22 terminates the decoding of the MC area 1B. The MC decoding section 22 then shifts the stream read pointer to a position corresponding to either a portion of the MPEG1 side information 11 or an MPEG1 sample information block following a portion of the MPEG1 side information 11 or the MPEG1 sample information block decoded by the MPEG1 decoding section 21 most recently. Thereafter, only the decoding by the MPEG1 decoding section 21 is performed.

If the results of the CRC are not acceptable, the MC decoding section 22 shifts the stream read pointer to the head of the first MPEG1 sample information block 13, to allow the first MPEG1 sample information block 13 to be decoded by the MPEG1 decoding section 21 and output to the PCM output buffer 42. Then, the second MPEG1 sample information block 15 is decoded. In this way, only the MPEG1 compatible area 1A is decoded.

Thus, in this embodiment, the header of the MC area 1B can be analyzed without completing the decoding of the entire MPEG1 compatible area 1A beforehand which is otherwise necessary as in the decoding method stipulated in ISO-IEC 13818-3. This enables reduction of the device size.

Moreover, the following problem arising in the conventional device as described above can be overcome. That is, when a bit stream having only the MPEG1 compatible area 1A without the MC area 1B is input, decoding of a portion of the bit stream corresponding to the MC area 1B, which is actually not the MC area 1B, is started if the bit stream happens to pass CRC for the MC area 1B, causing erroneous operation. In this embodiment, however, even if the bit stream passes the CRC for the MC area 1B, decoding of the MC area 1B is terminated if the number of channels in the MC section 1B is zero or if the MC area 1B is attempted to be decoded over a length exceeding one frame length, thereby further reducing the probability of an occurrence of erroneous operation.

In this embodiment, the detection of the MC header (the MC side information 12) is performed at a time before the scale factor of the MPETG1 compatible area 1A is detected. In view of the object of the present invention which is to determine whether or not the decoding of the MC area 1B is possible by locating the position of the MC header before the entire MPEG1 compatible area 1A is decoded, the time at which the MC header is detected may be at any point after the decoding of the scale factor selection information 53 if the bit stream 1 is according to Layer II or after the decoding of the allocation information 62 if the bit stream 1 is according to Layer I.

In this embodiment, a bit stream without an extension stream was used as the bit stream 1. In the determination of whether or not multichannel decoding is allowable based on comparison of stream lengths, the present invention is characterized in that, when the length of the decoded stream exceeds a length of a stream of encoded sound information of one frame, the MC area 1B is no longer detected but only the MPEG1 compatible area 1A is detected. In view of the above, substantially the same effects as those described above can be obtained for a stream having an extension stream by performing a processing similar to that described above using at least a length of (base frame length)+(extension stream length)−(n_ad_bytes) as the upper limit of the stream length effective for decoding.

Thus, according to the present invention, a bit stream defined by MPEG2 Multichannel is divided into a plurality of blocks for separate decoding. This enables the decoding to be performed using a buffer memory with a smaller capacity than that conventionally used. Moreover, according to the present invention, even when a bit stream mistakenly passes the CRC for the MPEG2 multichannel extended area, whether or not the MPEG2 multichannel extended area actually exists can be determined more correctly than in the conventional case based on the number of channels in the multichannel extended area and the remaining amount of bit stream in one frame. In this way, a decoding device with reduced occurrence of erroneous operation can be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A decoding device for decoding a bit stream defined by MPEG2 Audio Multichannel (MC), the bit stream including an MPEG1 compatible area and an MPEG2 multichannel extended area, the MPEG1 compatible area including MPEG1 side information, the decoding device comprising:

MPEG1 decoding means for decoding the MPEG1 compatible area;

MC decoding means for decoding the MPEG2 multichannel extended area; and

MC header detection means for executing a first processing including locating a position of a header of the MPEG2 multichannel extended area based on the MPEG1 side information and shifting a read position of the bit stream to the position of the header.

2. A decoding device according to claim 1, wherein the MC header detection means executes the first processing on the way to the decoding of the MPEG1 compatible area by the MPEG1 decoding means, and the MC decoding means executes a predetermined second processing after the MC header detection means executes the first processing.

3. A decoding device according to claim 2, wherein, after the execution of the predetermined second processing by the MC decoding means, the decoding device alternately executes the decoding of the MPEG1 compatible area by the MPEG1 decoding means and the decoding of the MPEG2 multichannel extended area by the MC decoding means.

4. A decoding device according to claim 1, wherein the bit stream includes a bit stream defined by MPEG2 Audio Multichannel, Layer I, the MPEG1 side information includes allocation information, and the MC header detection means locates the position of the header of the MPEG2 multichannel extended area based on the allocation information.

5. A decoding device according to claim 1, wherein the bit stream includes a bit stream defined by MPEG2 Audio Multichannel, Layer II, the MPEG1 side information includes allocation information and scale factor selection information, and the MC header detection means locates the position of the header of the MPEG2 multichannel extended area based on the allocation information and the scale factor selection information.

6. A decoding device according to claim 2, wherein the predetermined second processing includes a processing of reading MC side information from the position and executing error check for the MC side information.

7. A decoding device according to claim 6, wherein the error check (CRC) includes at least CRC.

8. A decoding device for decoding a first bit stream defined by MPEG1 and a second bit stream defined by MPEG2 Audio Multichannel (MC), the first bit stream including an MPEG1 compatible area, the second bit stream including the MPEG1 compatible area and an MPEG2 multichannel extended area, the MPEG1 compatible area including MPEG1 side information, the decoding device comprising:

MPEG1 decoding means for decoding the MPEG1 compatible area;

MC decoding means for decoding the MPEG2 multichannel extended area; and

MC header detection means for executing a first processing including locating a position of a header of the MPEG2 multichannel extended area based on the MPEG1 side information and shifting a read position of the bit stream to the position of the header, wherein the MC header detection means executes the first processing on the way to a processing of the MPEG1 decoding means, the MC decoding means reads information from the position after the MC header detection means executes the first processing, and executes the error check (CRC) for the information, when results of the CRC are normal, the decoding device alternately executes the decoding of the MPEG1 compatible area by the MPEG1 decoding means and the decoding of the MPEG2 multichannel extended area by the MC decoding means, and when the results of the CRC are abnormal, the decoding device executes only the decoding of the MPEG1 compatible area by the MPEG1 decoding means.

9. A decoding device for decoding a first bit stream defined by MPEG1 and a second bit stream defined by MPEG2 Audio Multichannel (MC), the first bit stream including an MPEG1 compatible area, the second bit stream including the MPEG1 compatible area and an MPEG2 multichannel extended area, the MPEG1 compatible area including MPEG1 side information, the decoding device comprising:

MPEG1 decoding means for decoding the MPEG1 compatible area;

MC decoding means for decoding the MPEG2 multichannel extended area; and

MC header detection means for executing a first processing including locating a position of a header of the MPEG2 multichannel extended area based on the MPEG1 side information and shifting a read position of the bit stream to the position of the header, wherein the MC header detection means executes the first processing on the way to a processing of the MPEG1 decoding means, the MC decoding means determines whether or not the number of channels in the MPEG2 multichannel extended area is zero based on information read from a position where MC side information for the MPEG2 multichannel extended area is stored, and if the number of channels in the MPEG2 multichannel extended area is zero, the decoding of the MPEG2 multichannel extended area is not performed, but only the MPEG1 compatible area is decoded.

10. A decoding device according to claim 9, wherein the MC decoding means reads information from the position after the MC header detection means executes the first processing, and executes the error check (CRC) for the information, and if the number of channels in the MPEG2 multichannel extended area is zero, the decoding device does not decode the MPEG2 multichannel extended area but decodes only the MPEG1 compatible area, even when results of the CRC are normal.

11. A decoding device for decoding a first bit stream defined by MPEG1 and a second bit stream defined by MPEG2 Audio Multichannel (MC), the first bit stream including an MPEG1 compatible area, the second bit stream including the MPEG1 compatible area and an MPEG2 multichannel extended area, the MPEG1 compatible area including MPEG1 side information, the decoding device comprising:

MPEG1 decoding means for decoding the MPEG1 compatible area; and

MC decoding means for decoding the MPEG2 multichannel extended area, wherein the decoding device terminates the decoding if a length of the bit stream consumed in the decoding of the MPEG2 multichannel extended area by the MC decoding means exceeds a stream length of one frame, and decodes only the MPEG1 compatible area.

12. A decoding device according to claim 11, wherein the stream length of one frame comprises a sum of an MPEG1 base frame length and an extension stream length when an extension stream defined by MPEG2 Audio Multichannel is included in the bit stream, and comprises the MPEG1 base frame length when no extension stream is included.

13. A decoding device according to claim 11, wherein the stream length of one frame comprises a value obtained by subtracting n_ad_bytes defined by MPEG2 Multichannel from a sum of an MPEG1 base frame length and an extension stream length when an extension stream defined by MPEG2 Audio Multichannel is included in the bit stream, and comprises the MPEG1 base frame length when no extension stream is included.

* * * * *